United States Patent
Kroth et al.

(10) Patent No.: US 7,861,811 B2
(45) Date of Patent: Jan. 4, 2011

(54) GROUND WHEEL DRIVE SYSTEM FOR AN AGRICULTURAL IMPLEMENT

(75) Inventors: Rogerio Kroth, Horizontina (BR); Ademar Gelbhar, Santa Rosa (BR)

(73) Assignee: Deere & Company, Moline, IL (US)

( * ) Notice: Subject to any disclaimer, the term of this patent is extended or adjusted under 35 U.S.C. 154(b) by 328 days.

(21) Appl. No.: 12/035,929

(22) Filed: Feb. 22, 2008

(65) Prior Publication Data
US 2008/0202828 A1 Aug. 28, 2008

(30) Foreign Application Priority Data
Feb. 24, 2007 (DE) .................. 10 2007 009 084

(51) Int. Cl.
*A01C 7/00* (2006.01)
*A01C 7/08* (2006.01)
(52) U.S. Cl. .................. 180/53.61; 180/53.6; 111/77; 172/106
(58) Field of Classification Search .......... 180/53.61, 180/357, 384, 53.6; 111/77, 177; 172/105, 172/106; 222/614, 623
See application file for complete search history.

(56) References Cited

U.S. PATENT DOCUMENTS

| | | | |
|---|---|---|---|
| 1,783,282 A | | 12/1930 | Cummings |
| 3,648,631 A | * | 3/1972 | Fiedler et al. ............... 111/120 |
| 3,738,181 A | | 6/1973 | Gandrud |
| 4,117,891 A | * | 10/1978 | Neukom ...................... 172/105 |
| 4,122,974 A | * | 10/1978 | Harbert et al. ................. 221/13 |
| 4,137,853 A | * | 2/1979 | Peterson ...................... 111/67 |
| 4,234,105 A | * | 11/1980 | Viramontes .................. 222/233 |
| 4,251,014 A | * | 2/1981 | Salley et al. ................. 222/615 |
| 4,259,872 A | * | 4/1981 | Chandler ....................... 74/13 |
| 4,697,662 A | * | 10/1987 | Zollmeyer et al. ........... 180/256 |
| 5,347,939 A | | 9/1994 | Hood |
| 6,170,412 B1 | * | 1/2001 | Memory et al. ............. 111/174 |
| 6,745,710 B2 | * | 6/2004 | Friestad et al. .............. 111/178 |
| 7,273,016 B2 | * | 9/2007 | Landphair et al. ........... 111/185 |

FOREIGN PATENT DOCUMENTS

| | | |
|---|---|---|
| AU | 813 666 | 1/1969 |
| EP | 0 360 754 | 3/1990 |
| EP | 1 380 459 | 1/2004 |
| FR | 1 107 022 | 12/1955 |
| FR | 2 398 441 | 2/1979 |

* cited by examiner

*Primary Examiner*—Faye M. Fleming
*Assistant Examiner*—George D. Spisich

(57) ABSTRACT

An implement drive arrangement for a wheel axle assembly pivotally connected to a housing. A drive element is supported on the axle for rotation with the wheel generally about the wheel axis. The housing rotatably supports a driven element for rotation about an axis generally fixed in relation to the housing. A free-floating connecting element is rotatably supported between the drive element and the driven element to facilitate relatively unimpeded pivoting of the axle and wheel relative to the housing. The connecting element has two degrees of freedom offset at 90° to one another and aligned radially relative to the axis of rotation to accommodate axle pivoting while assuring smooth transfer of power from the wheel to the driven element as the angular relationship changes between the axle and housing with movement of the wheel over irregular ground surfaces.

16 Claims, 5 Drawing Sheets

GROUND WHEEL DRIVE SYSTEM FOR AN AGRICULTURAL IMPLEMENT

This application claims priority to Application No: DE 10 2007 009084.8, filed 24 Feb. 2007.

FIELD OF THE INVENTION

The invention relates to a ground wheel drive system on an agricultural machine wherein at least one ground driven wheel is supported for movement by an axle suspension and is connected to a driven implement through a drivetrain.

BACKGROUND OF THE INVENTION

Demands for increased productivity and performance of agricultural tillage and seeding machines as soil tilling implements or combination cultivating and sowing machines have resulted in large, heavy machines. Such machines include, in particular, soil tilling implements and cultivating machines such as plows, harrows, cultivators, rotary hoes, and the like as well as planters, sowing machines and drilling machines, or combined cultivating and sowing machines, which combine several of the aforementioned implements. The increasing size of these machines and implements results in added weight that needs to be distributed to as large a ground contact area as possible to reduce soil compaction. To distribute the load, two-wheel arrangements are often utilized to create a larger contact area. Two-wheel arrangements generally have a corresponding axle suspension with two wheel axles arranged to move or pivot vertically to adjust to the changing ground contour of irregular ground surfaces.

Many implements have drive arrangements which serve to drive an attachment, such as an agitator or a metering device for fertilizers or seed, for example. Such drive arrangements often utilize drive from a ground engaging wheel, whether in a two-wheel arrangement or a single-wheel arrangement, connected through a drivetrain to the driven device on the implement.

In wheel arrangements having pivoting axles, drive arrangements must have power transferring mechanisms which can adjust to the movements of the wheel axles and the axle beams. Typically, a universal joint, tapered toothed or bevel gearing is utilized to accommodate the pivoting movements of the wheel. Such solutions, however, are sophisticated in design and are expensive to manufacture.

SUMMARY OF THE INVENTION

The object of the invention is to specify a drive arrangement of the aforementioned type which overcomes the aforementioned problems.

According to the invention, a drive arrangement of the aforementioned type has a drivetrain including a drive element supported on the axle beam and constrained for rotation with the wheel. A rotatably supported driven element is mounted in relation to a supportive housing, and a connecting element is rotatably supported between the drive element and the driven element. The connecting element is supported between the drive element and the driven element so that it is free-floating radially relative to its axis of rotation (that is, arranged so that it is free to move radially). This radial free float feature facilitates relative movements between the drive element and the driven element which occur radially to the axis of rotation of the drive element and the driven element when the axle beam or the wheel pivots relative to the housing. While allowing the free radial float, the connecting element transmits a rotational movement. The connecting element is in this case arranged between the drive element and the driven element and is axially fixed relative to the axis of rotation.

The connecting element has a cavity through which the axle beam extends. The axle beam therefore pivots inside the cavity in the connecting element. The connecting element is preferably of annular design and is arranged around the axle beam to optimize compactness. However, the connecting element may also assume other geometric shapes such as, for example, a plate or disc.

For transmitting a rotational movement from the drive element to the driven element, the connecting element has sides facing the drive element and the driven element with recesses and/or protrusions or elevations which mesh with protrusions and/or recesses formed on the drive element and the opposite driven element. The meshing of components transmits rotational movement from the drive element to the connecting element and thence to the driven element. The protrusions and recesses are matched to one another in such a way that an elevation can be received by a recess. As the elements rotate, the rotational movement is transmitted by the lateral faces of the elevations and/or recesses bearing against one another. The elevations may be formed on the drive element and the driven element and the recesses only on the connecting element. Inverse arrangements may also be appropriate, however, so that the elevations are formed on the connecting element and the recesses on the drive element and the driven element. It is also possible to form elevations and recesses on one of the elements, which mesh with a corresponding opposite elevations and/or recesses.

In one embodiment, the elevations and/or recesses formed on the connecting element are angularly offset by 180° on both sides of the connecting element. The elevations and/or recesses on one side of the connecting element are angularly offset by 90° relative to those on the other side of the connecting element. The elevations and/or recesses on the drive element and on the driven element meshing with the elevations and/or recesses on the connecting element are correspondingly arranged so that the elevations and/or recesses on the drive element and on the driven element are likewise offset by 180° in relation to one another. Pivoting of the axle beam or of the wheel can therefore be accommodated since the connecting element has two degrees of freedom offset at 90° to one another which are aligned radially to the axis of rotation. The connecting element is thereby capable of transmitting rotational movement from the drive element to the driven element and at the same time of permitting radial floating movements in any direction relative to its axis of rotation to accommodate pivoting movements of the wheel.

The elevations and recesses have end faces, which preferably are oriented radially to the axis of rotation of their corresponding element (drive element, driven element and connecting element), so that the connecting element is capable, within limited orbits, of free-floating movement radially to its axis of rotation. Sufficiently large force transmission areas are created on the flanks of the elevations and recesses to permit transmission of the rotational movements. It should be pointed out here that end faces are taken to mean the upper face of an elevation and the bottom face of a recess.

The elevations and recesses may have curved end faces with each recess meshing with an elevation to form a concavely/convexly curved pair of end faces. This construction results in a concavely curved end face of an elevation meshing with a recess which has a correspondingly convexly curved end face, and vice versa. The curved end face design enables the connecting element to float without any play to optimize guidance or floating support of the connecting element with little wear. End face configurations other than a curved, such as spherical shapes, are also feasible. In addition, the end faces may also be formed other than a curved surface such as a planar surface. A curvature would only reduce the play but would not affect the functionality. Smooth or planar end faces, whether formed on one or both sides or in pairs, are therefore functionally equivalent in use. The same applies to spherical or curved surfaces of the end faces.

The assembly drive device comprises a chain drive arranged on the housing and drivingly connected to the driven element of the drivetrain. The driven element may be rotationally locked to a gear or pinion driving the chain drive. The gear itself may constitute a driven element of the drivetrain and be provided with corresponding elevations and/or recesses, which mesh with the connecting element. Instead of the chain drive, other drive arrangements such as V-belt or toothed belt or friction belt drives and toothed gear drives can also be used.

The drive arrangement according to the invention is described for a two-wheel arrangement of an agricultural machine but may also be utilized with other pivoting suspension drive axle or the drive element arrangements.

The driven implement may be a metering device for fertilizers and seed or an agitator or other device which is used on the agricultural machine or soil tilling implement or the combined cultivating and sowing machine. The drive may also be used, for example, to drive a spraying device or a mixing device for mixing seed with other materials or chemicals. The drive arrangement according to the invention may also be used to drive a combination of one or more devices.

The invention and further advantages and advantageous developments and embodiments of the invention will be described and explained in more detail with reference to the drawings.

DESCRIPTION OF THE PREFERRED EMBODIMENT

Figure 1:
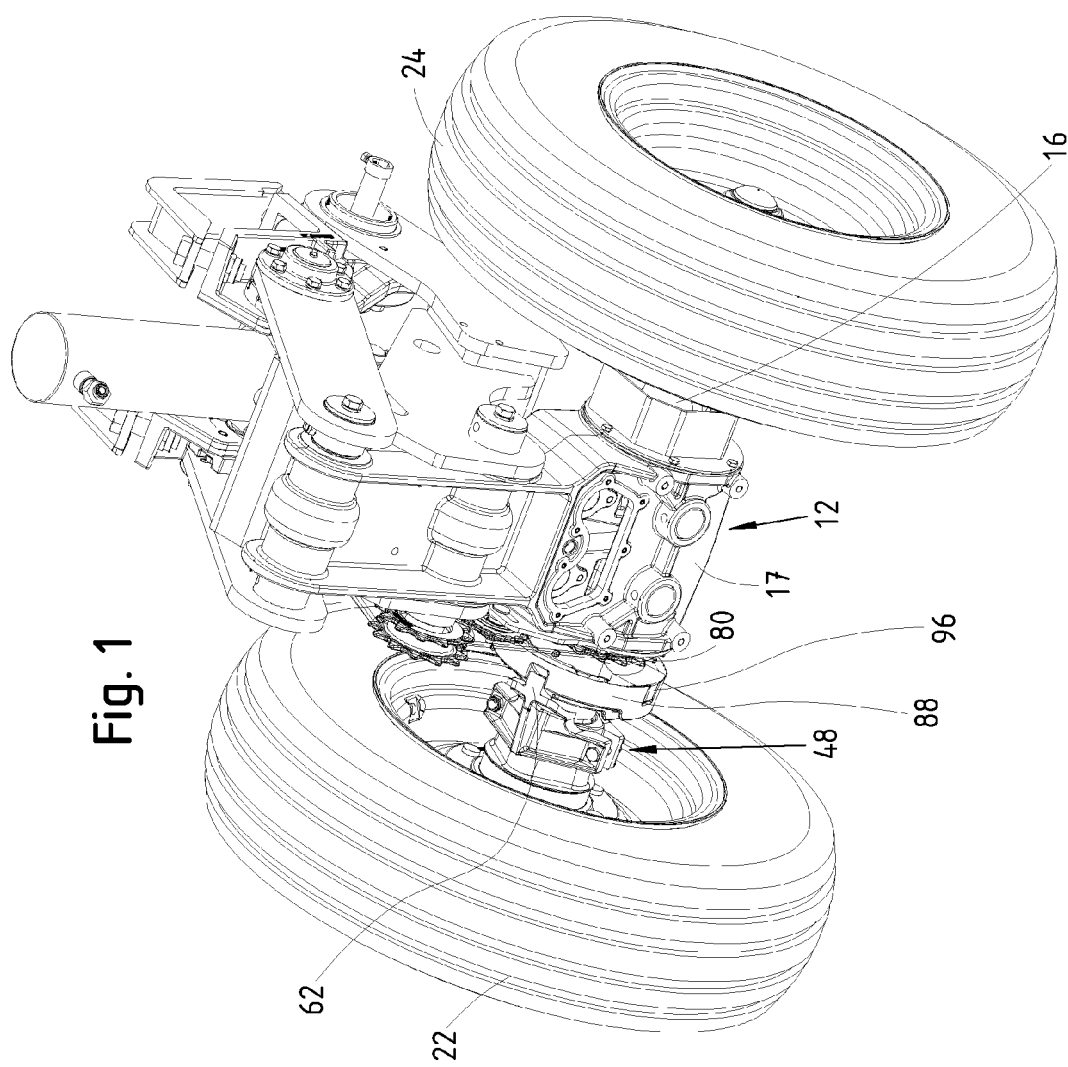
FIG. 1 is a perspective, rear view of a two-wheel axle assembly having a drive arrangement according to the invention.

FIG. 1 shows a two-wheel arrangement or axle assembly 10 having an axle suspension 12 supporting axle beams 18, 20 which extend through apertures 14, 16 on opposite sides of a housing 17. Wheels 22, 24 are supported by the axle beams 18, 20 for pivoting relative to the housing 17.

Figure 4:
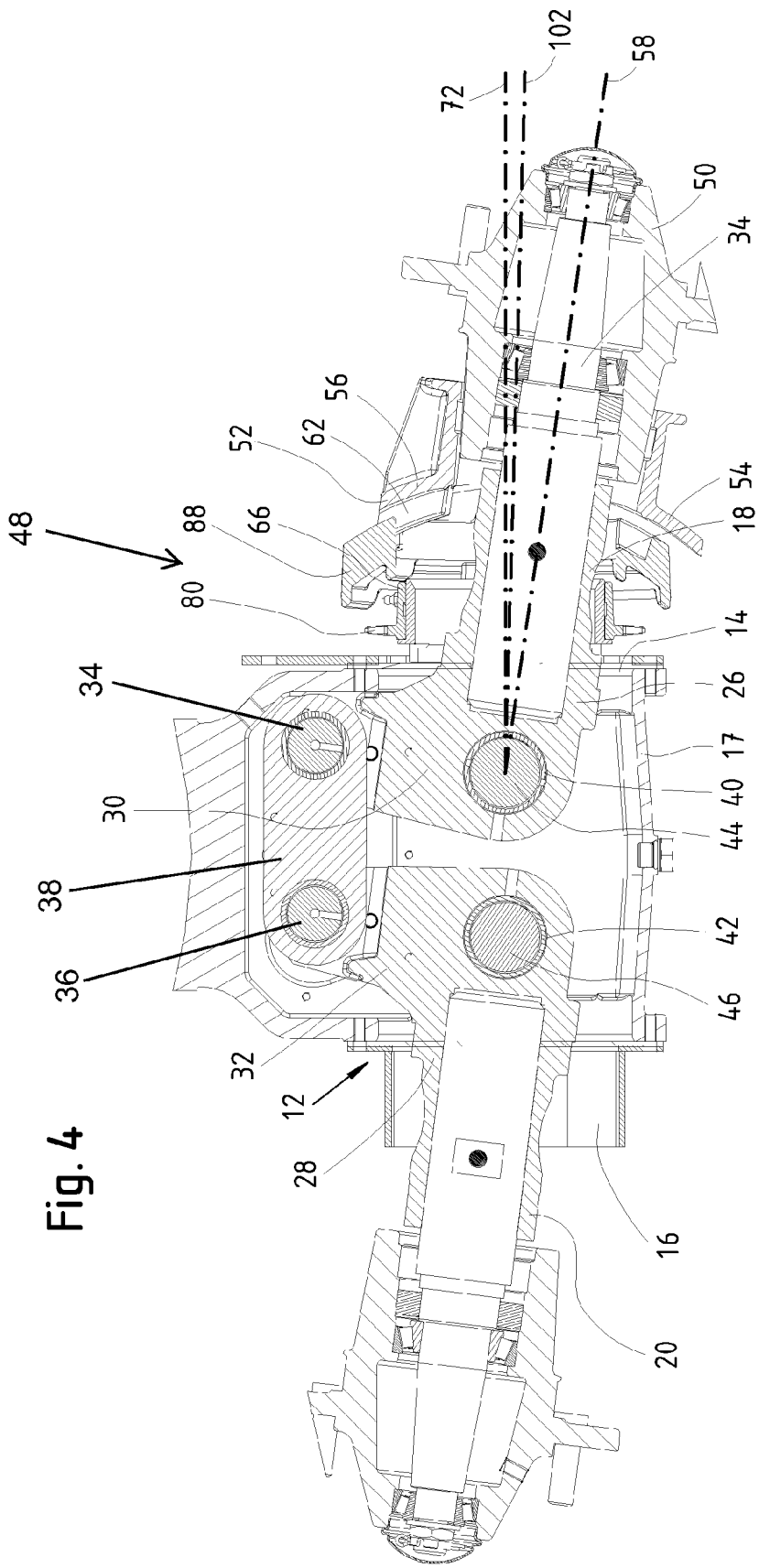
FIG. 4 is a cross sectional front view of the axle suspension of the two-wheel axle assembly in FIG. 1.

The axle beams 18, 20 are of articulated knuckle-joint design, as can best be seen from FIG. 4, and comprise a first member 26, 28 and a second member 30, 32, which are arranged at right angles to one another. The first members 26, 28 are each connected to a wheel axle 34, 36, on which the wheels 22, 24 are rotatably supported.

The wheels 22, 24 support the axle suspension 12 in relation to the ground with the first members 26, 28 extending axially, or transversely to the direction of rotation of the wheels 22, 24.

The second members 30, 32 extend in an upright direction and are rigidly connected to the first member 26, 28. The end areas of the second members 30, 32 are constrained for movement together by connecting pins 34, 36 and a rigid connecting strut 38.

Guide bushings 40, 42 receive pivot pins 44, 46 which are fixedly supported on the housing 17 to define fore-and-aft extending pivotal axes located between the first and the second members 26, 28 and 30, 32, respectively.

The interaction of the components described above is illustrated in FIG. 4. The axle beams 18, 20 are pivotally supported by their guide bushings 40, 42 on the pivot pins 44, 46 which in turn are supported on the housing 17. The axle beams 18, 20 therefore can pivot relative to the housing 17 about the longitudinal axis of the pivot pins 44, 46. The axle beams 18, 20 therefore define pivoting bodies which allow an up and down movement of the first members 26, 28 and of the wheel axles 34, 36 and hence of the wheels 22, 24 in a vertical direction relative to the ground.

The second members 30, 32 rigidly arranged at right angles to the first members 26, 28 pivot with the first members 26, 28. As one of the wheels 22, 24 rolls over an undulation in the ground, for example, the second wheel will move in the opposite vertical direction as the first wheel. The two second members 30, 32 extending in a vertical direction are articulated to one another through the connecting strut 38 and the connecting pins 34, 36 carried in bearing apertures on the housing 17. The connecting strut 38 here transmits a resulting pivoting movement of the one axle beam 18, 20 to the other axle beam 18, 20 so that a pivoting movement of the one axle beam 18, 20 gives rise to a pivoting movement of the other axle beam 18, 20 in the same direction. The connecting strut 38 and the connecting pins 34, 36 therefore constitute connecting structure which articulates the second members 30, 32 with one another. If the right-hand wheel 24 as shown in FIG. 1 runs upwardly over an undulation in the ground, for example, the right-hand axle beam 20 in FIG. 1 performs an upward pivoting movement and the left-hand axle beam 18 in FIG. 1 performs a downward pivoting movement. This action is represented by way of example in FIG. 4 (FIG. 1 showing a rear view and FIG. 4 showing a front view).

Figure 2:
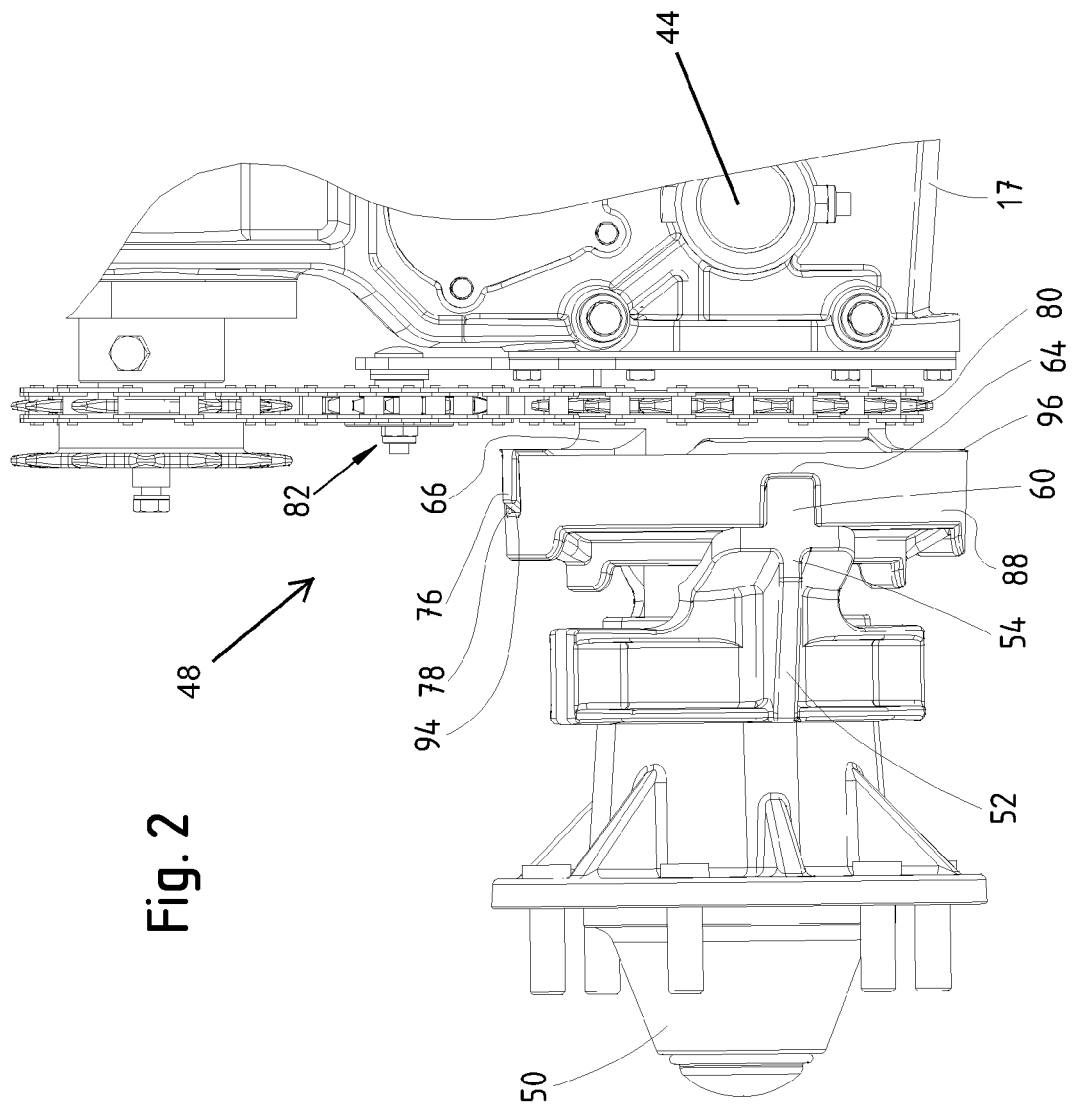
FIG. 2 is a rear, plan view of the drive arrangement in FIG. 1.
Figure 3:
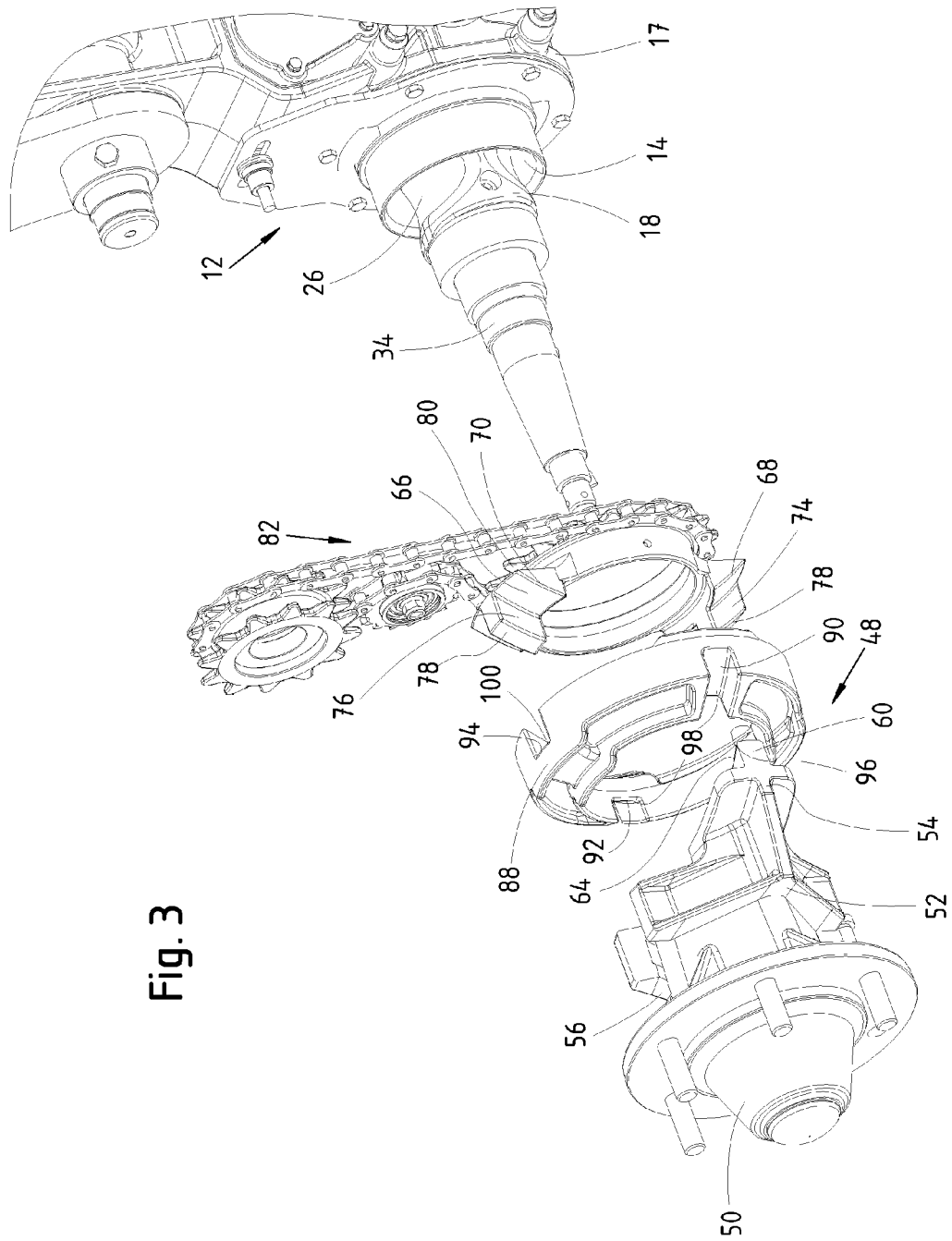
FIG. 3 is an exploded perspective view of the drive arrangement in FIG. 1.

A drive arrangement 48 according to the invention, as is described in more detail below with reference to FIGS. 2 to 4, is provided on the left hand axle beam 18 represented in FIG. 1 (and represented on the right-hand side of the illustration in FIG. 4).

The drive arrangement 48 comprises a drive element 52 secured for rotation with the wheel 22 or to a corresponding wheel hub 50. The drive element 52 is of hollow design so that the corresponding wheel axle 34 can extend through the element. The drive element 52 together with the hub 50 are therefore supported on the corresponding axle beam 18 and move up and down with pivoting movement of the beam 18. The drive element 52 has two wing-like projections 54, 56 which are spaced at an interval of 180° on the circumference of the drive element 52 and which extend axially to the axis of rotation 58 of the drive element 52. Web-shaped elevations or projections 60, 62, which rise in an axial direction to the axis of rotation 58 of the drive element 52 and have end faces 64 preferably oriented radially to the axis of rotation 58, are formed on the projections 54, 56.

The drive arrangement 48 further comprises a driven element 66 rotatably supported on the housing 17. The driven element 66 is of hollow design so that the corresponding wheel axle 34 can extend through the element. The driven element 66 is therefore fixed in relation to the housing 17 so that its axis of rotation stays generally fixed relative to the housing. The cavity in the driven element 66 is dimensioned so that under maximum pivoting of the axle beam 18 the axle beam 18 does not impinge against the cavity wall of the driven element 66. The axle beam 18 can therefore move and be swivelled unimpededly inside the axle beam cavity.

The driven element 66 has two wing-like projections 68, 70, which are spaced at 1800 intervals around the circumference of the driven element 66 and which extend axially to the axis of rotation 72 of the driven element 66. Web-shaped elevations 74, 76, which project in an axial direction to the axis of rotation 72 of the driven element 66 and have end faces 78 preferably oriented radially to the axis of rotation 72, are formed on the projections 68, 70.

The driven element 66 is provided with or connected to a wheel rim, a gear or a pinion 80, which in turn powers a chain drive structure 82 supported at least in part on the housing 17. The chain drive 82 is of conventional construction and is connected to a drive element such as a drive shaft 84 (FIG. 1) of an implement or a device to be driven, for example an agitator for a seed tank or a metering device 86 for dispensing seed.

A connecting element 88 is arranged between the drive element 52 and the driven element 66, as can be best seen in FIG. 3. The connecting element 88 is of hollow design in the form of a ring, through which the axle beam 18 extends. The cavity in the connecting element 88 is dimensioned so that under maximum pivoting of the axle beam 18 the axle beam 18 does not impinge against the cavity wall of the connecting element 88. The axle beam 18 can move and swivel unimpededly inside the connecting element cavity. The connecting element 88 has two drive-side recesses 90, 92 which are spaced at 180° intervals around the circumference and two driven-side recesses 94, 96 also spaced at 180° intervals around the circumference. The drive-side recesses 90, 92 are offset by 90° in relation to the driven-side recesses 94, 96. The drive-side, web-shaped elevations 60, 62 are oriented towards the drive-side recesses 90, 92, whereas the driven-side, web-shaped elevations 74, 76 are oriented towards the driven-side recesses 94, 96. The recesses 90, 92, 94, 96 also have end faces 98, 100 which are preferably oriented radially to the axis of rotation 102 of the connecting element 88.

The elevations or projections 60, 62, 74, 76 are matched to the recesses 90, 92, 94, 96 in such a way that they positively interlock in the recesses 90, 92, 94, 96. The interlocking of the elevations 60, 62, 74, 76 in the recesses 90, 92, 94, 96 define meshing structure that affords floating support for the connecting element 88 between the drive element 52 and the driven element 66. The floating support assures that the connecting element 88 can move radially in such a way to compensate for the different axial alignments of the axes of rotation 58, 72 of the drive element 52 and the driven element 66, which occur as soon as the axle beam 18 is pivoted. Simultaneously, a rotationally fixed connection between the drive element 52 and the connecting element 88 and between the connecting element 88 and the driven element is maintained. The end faces 64, 78, 98, 100 are preferably of curved design to ensure maximum or optimum interlocking in all pivot positions of the axle beam 18. The curvatures of the end faces 64, 78, 98, 100 are selected so that the end faces 64 on the elevations 60, 62 are concave and the end faces 98 on the recesses 90, 92 are correspondingly convex, and that the end faces 100 on the recesses 94, 96 are concave and the end faces 78 on the elevations 74, 76 are correspondingly convex. This structure results in a positive interlock matched to the movements of the connecting element 88, so that the connecting element 88 is always optimally guided by the curvatures formed on the end faces 64, 78, 98, 100 while the elevations 60, 62, 74, 76 slide to and fro in the recesses 90, 92, 94, 96 and transmit a rotational movement and a drive torque via their flanks. The positions assumed by the connecting element 88 as the connecting element 88 rotates also encompasses slight angular variations of its own axis of rotation 102 relative to the axes of rotation 58, 72, which is assisted by the curved surfaces of the end faces 64, 78, 98, 100 in such a way that an optimum interlock is also obtained between the end faces 64, 78, 98, 100 in an axial direction. The curvatures of the end faces 64, 78, 98, 100 in a radial direction have a radius of curvature which is equal to the distance of the corresponding end faces 64, 78, 98, 100 from the longitudinal axis of the pivot pin 44 of the axle beam 18 forming the pivot axis.

Figure 5:
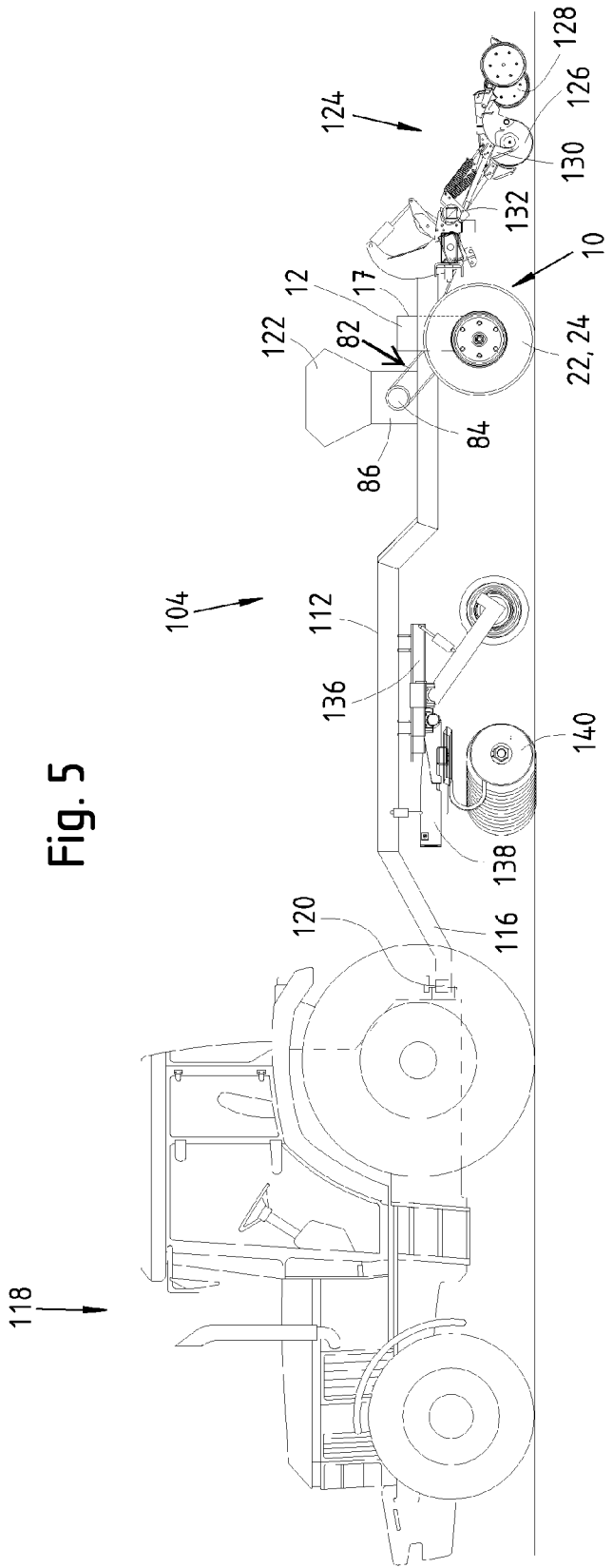
FIG. 5 is a side view of a soil tilling implement drawn by a tractor and having a metering device driven by a drive arrangement according to the invention.

FIG. 5 shows an example of a drive arrangement 48 according to the invention on a combination cultivating and seeding agricultural machine 104. The combination machine 104 has a frame 112 which extends in the forward direction (from left to right in the drawing) and which is supported on the ground by the wheels 22, 24 and axle suspension 12. At the front end the frame 112 a drawbar 116 is connected through a detachable coupling 120 to a towing vehicle 118 such as an agricultural tractor.

Forwardly of the wheels 22, 24 a seed box 122 is supported on the frame 112. The seed is measured out from the seed box 122 by the metering device 86 as the device is driven by the chain drive 82 and the drive arrangement 48 according to the invention. Seed is delivered through seed lines (not shown) to seeding units 124 supported at the rear of the frame 112. The units 124 include furrow openers 126 which deliver the seed into the furrow and closing wheels 128 for subsequently closing the furrow behind furrow forming coulter structure 130.

Multiple seeding units 124 are spaced transversely along an implement carrier 132 mounted on the frame 112 and extending transversely to the forward direction. Forwardly of the seed box 122 a carrier frame 136 is fixed beneath the frame 112 and carries a pivoting frame 138. A soil tilling implement 140 such as a disc harrow is supported from the frame 138. Other soil tilling implements 140 may be used instead of the disc harrow.

Although the invention has only been described with reference to one exemplary embodiment, many different alternatives, modifications and variants coming within the scope of the present invention will become apparent to a person skilled in the art in the light of the description above and the drawings.

The invention claimed is:

1. A drive arrangement for powering a driven implement from a ground wheel on an agricultural machine, the drive arrangement comprising an axle suspension having a housing, a pivoting axle having an inner end supported from the housing and an outer end, a ground driven wheel supported from the outer end for pivoting with the axle, a connecting drive extending between the wheel and the housing, and a drive device extending between the connecting drive and the implement for powering the implement from the wheel, wherein the connecting drive comprises a drive element supported on the axle for rotation with the wheel, a driven element supported for rotation on the housing about a first axis of rotation generally fixed relative to the housing, wherein the driven element rotates on the housing and the angular relationship between the first axis of rotation and the housing remains generally constant as the axle pivots, and a connecting element rotatably supported between the drive element and the driven element, the connecting element having an element axis of rotation and being free-floating for facilitating movement of the element axis of rotation angularly relative to the first axis and to the axle to maintain driving contact between the drive element and the driven element to facilitate pivoting of the axle and wheel relative to the housing while simultaneously providing drive from the wheel to the implement.

2. The drive arrangement according to claim 1 wherein the connecting element includes a cavity through which the axle extends.

3. The drive arrangement according to claim 1 wherein the connecting element is of annular design.

4. The drive arrangement as set forth in claim 1 wherein the connecting element includes opposite sides facing the drive element and the driven element, the sides and driven element including meshing structure having mating recesses and elevations transferring rotational movement of the drive element to the connecting element.

5. The drive arrangement as set forth in claim 4 wherein the recesses and elevations are located on the opposite sides of the connecting element, and wherein the meshing structure is spaced at 180 degree intervals on one side of the connecting element and is offset by 90° to the meshing structure on the other side of the connecting element.

6. The drive arrangement as set forth in claim 4 wherein the recesses and elevations are supported for rotation around axes and include end faces oriented radially to their respective axes.

7. The drive arrangement as set forth in claim 4 wherein the recesses and elevations have curved end faces, each recess meshing with an elevation to form a concavely/convexly curved pair of end faces.

8. The drive arrangement as set forth in claim 1 including a chain drive supported at least in part on the housing, and wherein the driven element is drivingly connected to the chain drive.

9. The drive arrangement as set forth in claim 1 including a second axle also having an inner end pivotally connected to the housing and an outer end connected to a second wheel.

10. The drive arrangement as set forth in claim 9 wherein the second axle is constrained to rotate in unison with the first-mentioned axle and wherein the second wheel is unconnected to the driven element.

11. The drive arrangement as set forth in claim 1 wherein the wheel comprises a dispensing implement support wheel supporting a dispensing system and wherein the driven element is connected to a driven device connected to the dispensing mechanism.

12. An implement drive arrangement comprising a housing connected to the implement, a wheel axle assembly including a wheel axle pivotally connected to the housing and a wheel mounted for rotation about a wheel axis on the axle, a drive element is supported on the axle for rotation with the wheel generally about the wheel axis, a driven element supported on the housing for rotation about a fixed axis on the housing, wherein the positional relationship between the axis of the driven element and the housing remains generally constant as the axle pivots relative to the housing, a free-floating connecting element rotatably supported on the wheel axle between the drive element and the driven element, the free-floating connecting element having a rotational axis movable angularly relative to the fixed axis thereby facilitating relatively unimpeded pivoting of the axle and the wheel relative to the housing while assuring smooth transfer of power from the wheel to the driven element as angular relationship between the axle and housing changes with movement of the wheel over irregular ground surfaces.

13. The drive arrangement as set forth in claim 12 wherein the free-floating connecting element comprises an annular member sandwiched between the drive element and the driven element, wherein the axle extends through the annular member and is movable vertically relative to the annular member.

14. The drive arrangement as set forth in claim 13 wherein the drive element, driven element and connecting element include mating pairs of force-transferring protrusions and recesses.

15. The drive arrangement as set forth in claim 14 wherein the drive element and the connecting element comprise a first set of mating pairs of protrusions and recesses and the connecting element and the driven element comprise a second set of mating pairs of protrusions, and wherein the first set is offset approximately 90 degrees from the second set.

16. The drive arrangement as set forth in claim 15 wherein the first set of mating pairs comprises mating pairs offset at intervals of 180 degrees from one another, wherein the connecting element has two degrees of freedom offset at 90° to one another and aligned radially to an axis of rotation of the annular member.

* * * * *